US 8,473,999 B2

(12) United States Patent
Collet et al.

(10) Patent No.: US 8,473,999 B2
(45) Date of Patent: Jun. 25, 2013

(54) METHOD AND APPARATUS FOR PROVIDING A PICTURE IN PICTURE SERVICE

(75) Inventors: Jean-Luc Collet, La Gaude (FR); Francois-Xavier Drouet, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 11/672,188

(22) Filed: Feb. 7, 2007

(65) Prior Publication Data
US 2007/0192816 A1 Aug. 16, 2007

(30) Foreign Application Priority Data
Feb. 14, 2006 (EP) ..................................... 06300136

(51) Int. Cl.
*H04N 7/173* (2011.01)
(52) U.S. Cl.
USPC ............... 725/120; 725/95; 725/97; 725/114; 725/115; 725/116; 725/117; 725/118; 725/119; 375/240.1; 370/390
(58) Field of Classification Search
USPC .......................................... 725/116; 375/240
See application file for complete search history.

(56) References Cited

U.S. PATENT DOCUMENTS

| 6,339,842 | B1 | 1/2002 | Fernandez et al. | |
| 6,784,945 | B2* | 8/2004 | Norsworthy et al. | 348/731 |
| 6,792,617 | B2 | 9/2004 | Gorbatov et al. | |
| 2003/0208763 | A1* | 11/2003 | McElhatten et al. | 725/58 |
| 2004/0125803 | A1* | 7/2004 | Sangroniz et al. | 370/390 |
| 2004/0184523 | A1* | 9/2004 | Dawson et al. | 375/240.1 |
| 2006/0120723 | A1* | 6/2006 | Diouf et al. | 398/71 |

FOREIGN PATENT DOCUMENTS

| EP | 1073270 A1 | 1/2001 |
| EP | 1521468 A1 | 4/2005 |

OTHER PUBLICATIONS

EPO Office Action, Application No. 06 830 694.3-1241, Office Action Dated Jan. 20, 2009.

* cited by examiner

*Primary Examiner* — Joshua Taylor
(74) *Attorney, Agent, or Firm* — Andrea Bauer; Hoffman Warnick LLC

(57) ABSTRACT

A method of forming a picture in picture (PIP) service over an internet protocol (IP) transmission to one or more users, the method comprising the steps of: receiving a request for a PIP channel comprising a first predetermined channel superimposed with a second predetermined channel; determining if the PIP channel already exists; forming the PIP channel if it does not already exist; and transmitting the PIP channel on a dedicated channel to any users who have requested that PIP channel.

11 Claims, 5 Drawing Sheets

METHOD AND APPARATUS FOR PROVIDING A PICTURE IN PICTURE SERVICE

FIELD OF THE INVENTION

The present invention relates to a method and apparatus for providing a picture in picture service to a user, and to a system and a computer program product for providing a picture in picture service.

BACKGROUND OF THE INVENTION

In the Internet Protocol Television (IPTV) environment where a plurality of multicast transmissions are transmitted to a user, there exist several service providers which provide a picture in picture (PIP) service. PIP services are those in which two or more video streams are displayed simultaneously. Generally one is smaller than the other (or others) and the smaller one overlays the larger.

In these current services the PIP is provided in an analogue format and the set top box (STB) or television (TV) at the user end of the transmission is where the PIP is formed.

In the digital format and with services such as internet protocol TV (IPTV) each picture requires a tuner and sufficient bandwidth for each. For example to have a PIP based on three channels, three tuners or decoders would be required at the STB or TV and a bandwidth of >10 Mb/s (3×3.75 Mb/s). This is costly in terms of equipment and bandwidth costs and overheads. Accordingly this functionality is rarely made available to users.

One object of the present invention is to provide a PIP method and apparatus which overcomes at least one of the problems of the prior art.

SUMMARY OF THE INVENTION

The present invention is directed to the method and system as defined in the independent claims.

According to a first aspect of the present invention, there is provided a method of forming a picture in picture (PIP) service over an internet protocol (IP) transmission to one or more users, the method comprising the steps of: receiving a request for a PIP channel comprising a first predetermined channel superimposed with a second predetermined channel; determining if the PIP channel already exists; forming the PIP channel if it does not already exist; and transmitting the PIP channel on a dedicated channel to any users who have requested that PIP channel.

According to a second aspect of the present invention, there is provided a system of forming a picture in picture (PIP) service over an internet protocol (IP) transmission to one or more users, the system comprising: means for receiving a request for a PIP channel comprising a first predetermined channel superimposed with a second predetermined channel; means for determining if the PIP channel already exists; means for forming the PIP channel if it does not already exist; and means for transmitting the PIP channel on a dedicated channel to any users who have requested that PIP channel.

According to a third aspect of the present invention, there is provided a computer program product stored on a computer readable medium for forming a picture in picture (PIP) service over an internet protocol (IP) transmission, the computer readable medium comprising program code for performing the steps of: receiving a request for a PIP channel comprising a first predetermined channel superimposed with a second predetermined channel; determining if the PIP channel already exists; forming the PIP channel if it does not already exist; and transmitting the PIP channel on a dedicated channel to any users who have requested that PIP channel.

Further embodiments of the invention are provided in the appended dependent claims.

The result of preparing the PIP channel in this way is that the STB or TV at the user end only needs one tuner. As the PIP is created, encoded as a single channel and sent as a signal channel there is no need for the STB or TV to have additional tuners at the user location. Apart from the PIP client, all other resources for this invention will be found at the headend equipment and will be used for multiple users, thereby minimizing the overhead in equipment for the system as a whole.

BRIEF DESCRIPTION OF THE DRAWINGS

Reference will now be made by way example, to the accompanying drawing, in which.

DETAILED DESCRIPTION OF THE INVENTION

Figure 1:
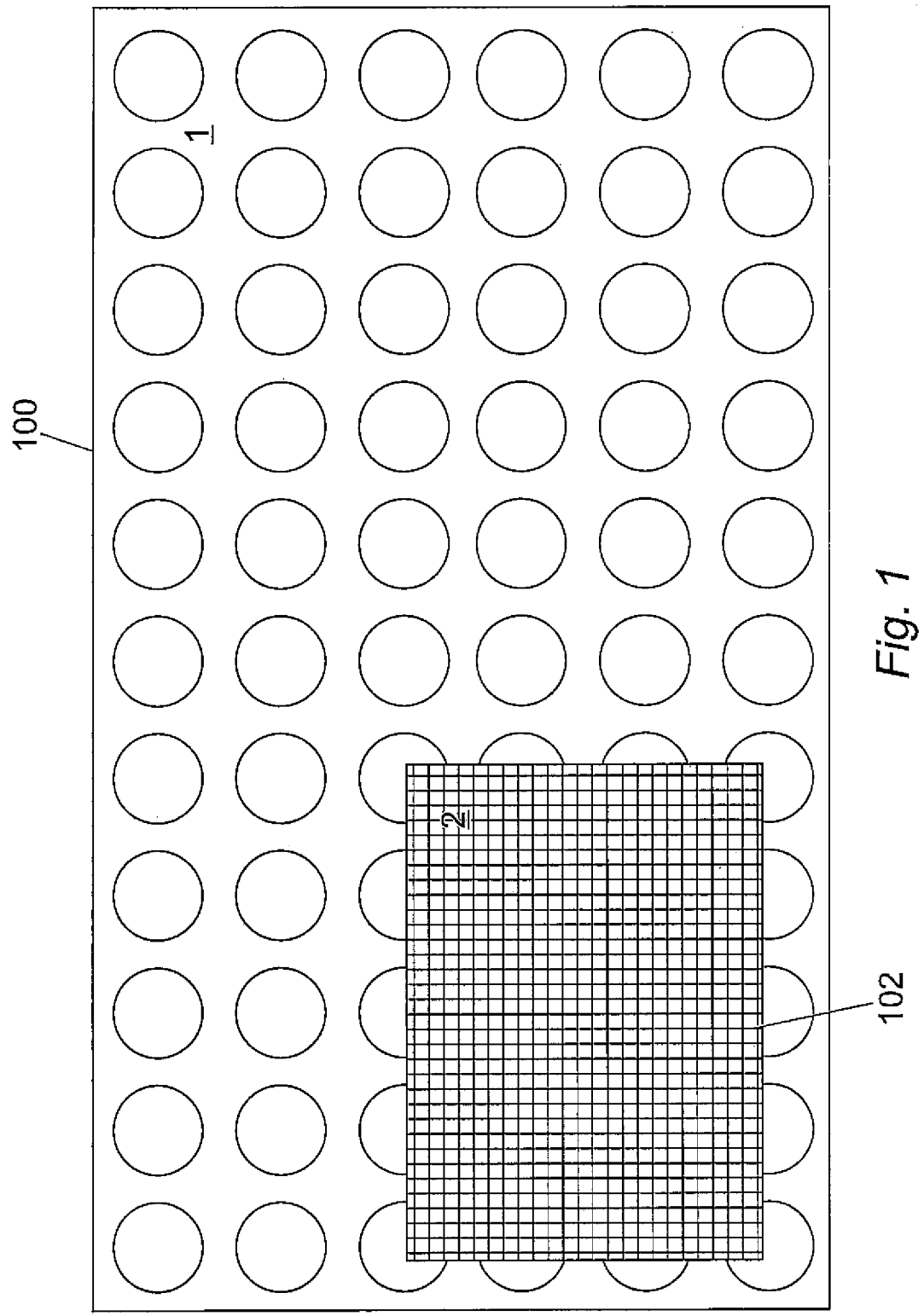
FIG. 1 is an example of a picture in picture (PIP)

FIG. 1 shows a picture in picture service which has been generated, for example as part of an IPTV service providing a plurality of multicast transmissions to a plurality of users. The picture in picture service shows a main picture 100 and a picture in picture (PIP) 102. This shows the nature of PIP, but clearly many variations are possible (e.g., more PIP's, different sizes, formats, etc.).

Figure 2:
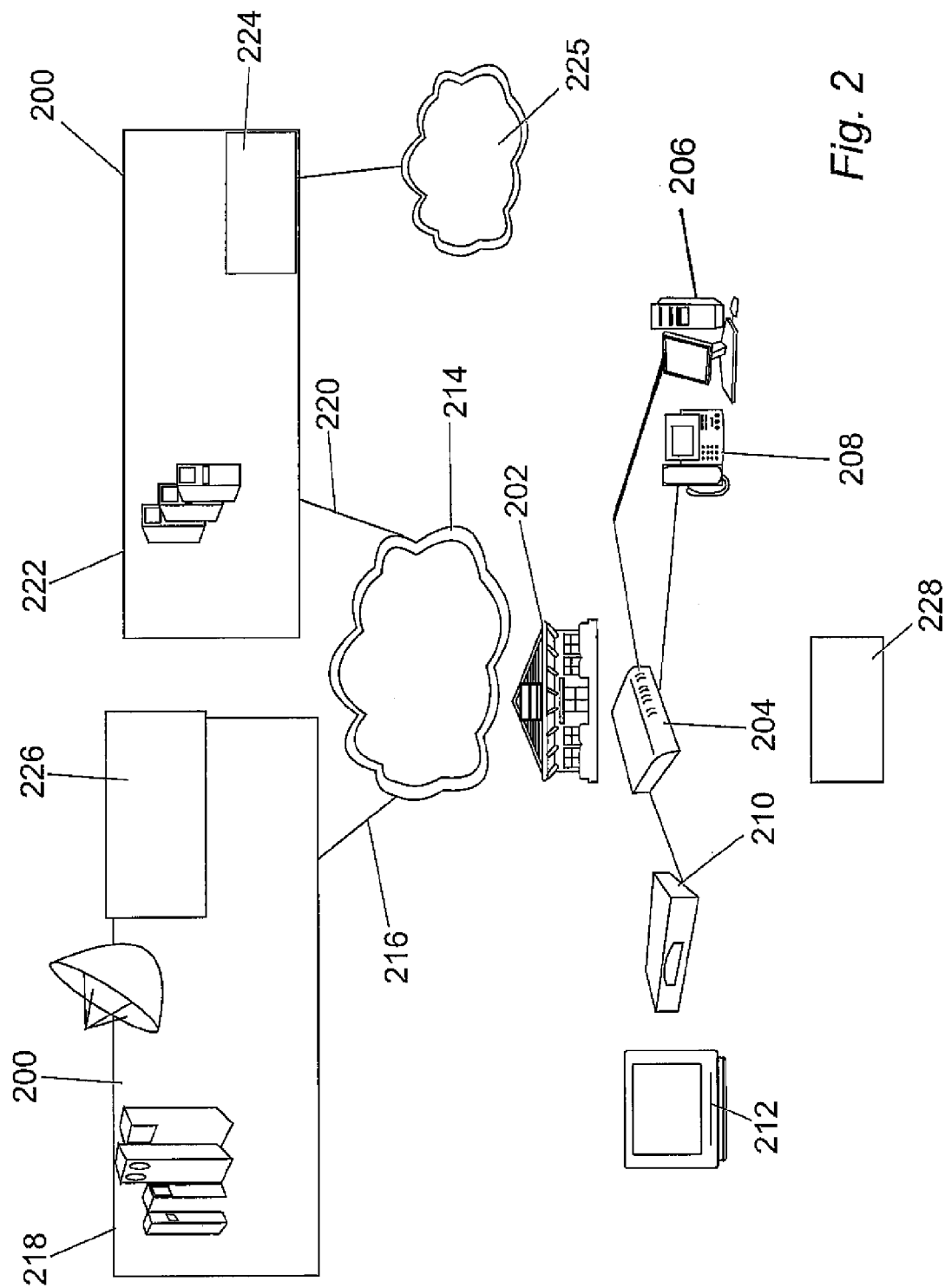
FIG. 2 is a block diagram of a system for delivering a PIP service to a user, according to the present invention.

FIG. 2 is a block diagram of a system 200 for providing a PIP to a user location 202. The user location 202 includes a residential gateway 204 connected to, for example, a personal computer (PC) 206, a telephone (either internet protocol or normal telephony) 208, a STB 210 and TV 212. The gateway receives information from the Network 214. The information may be in the form of multicast transmission 216 from a headend equipment 218 or other type of transmission 220 from so called middleware equipment 222. The multicast transmission 216 may be in the form of TV transmission to multiple users all subscribing to the same multicast channels. This may be carried out by any appropriate headend equipment 218 including encoders, transcoders, etc. The multicast streaming 216 uses the Internet Group Management Protocol (IGMP).

A unicast may also be a TV unicast which offers a different stream to each user. The video on demand (VOD) real time streaming protocol (RTSP) is used for the unicast. This unicast can be produced by the middleware equipment 222, which can take on any appropriate type. Using a unicast a user may also obtain Time Shift TV or Network Personal Video Recorder (NPVR) services through a portal. This allows time user to have pause, fast-forward and remind functions on a unicast made broadcast.

The middleware 222 may also include a soft switch 224 which may provide a telephony service, such as Voice Over Internet Protocol (VOIP) from Public Switch Telephone Network (PSTN) 225.

The system 200 also includes server 226 at the headend which is a Picture in Picture protocol (PIPP) server 226 and a PIPP client 228 at the user end. The detailed operation of this server 226 and client will be described in great detail below.

The PIPP server 226 may form part of the encoders or part of the control equipment or software. The PIPP client 228 is most likely to be located in the STB 210 or TV receiver 212 as appropriate.

Figure 3:
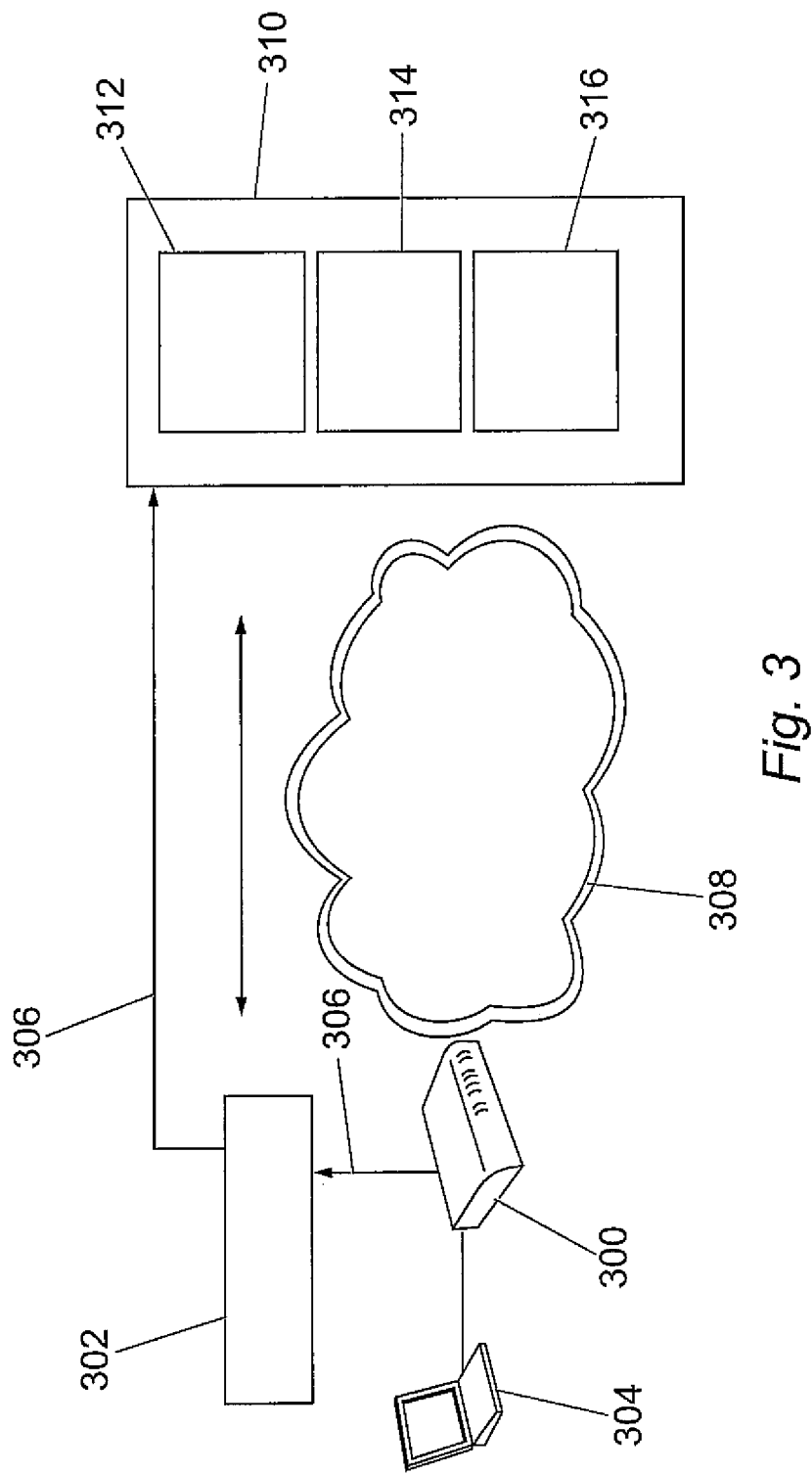
FIG. 3 is a block diagram for explaining the functionality of the PIP service, according to the present invention.

FIG. 3 outlines how the new protocol PIPP will allow a user to enquire about the availability of IGMP allowing a PIP request on a particular channel, and, how the network encoder can build an appropriate PIP multicast channel.

Figure 4:
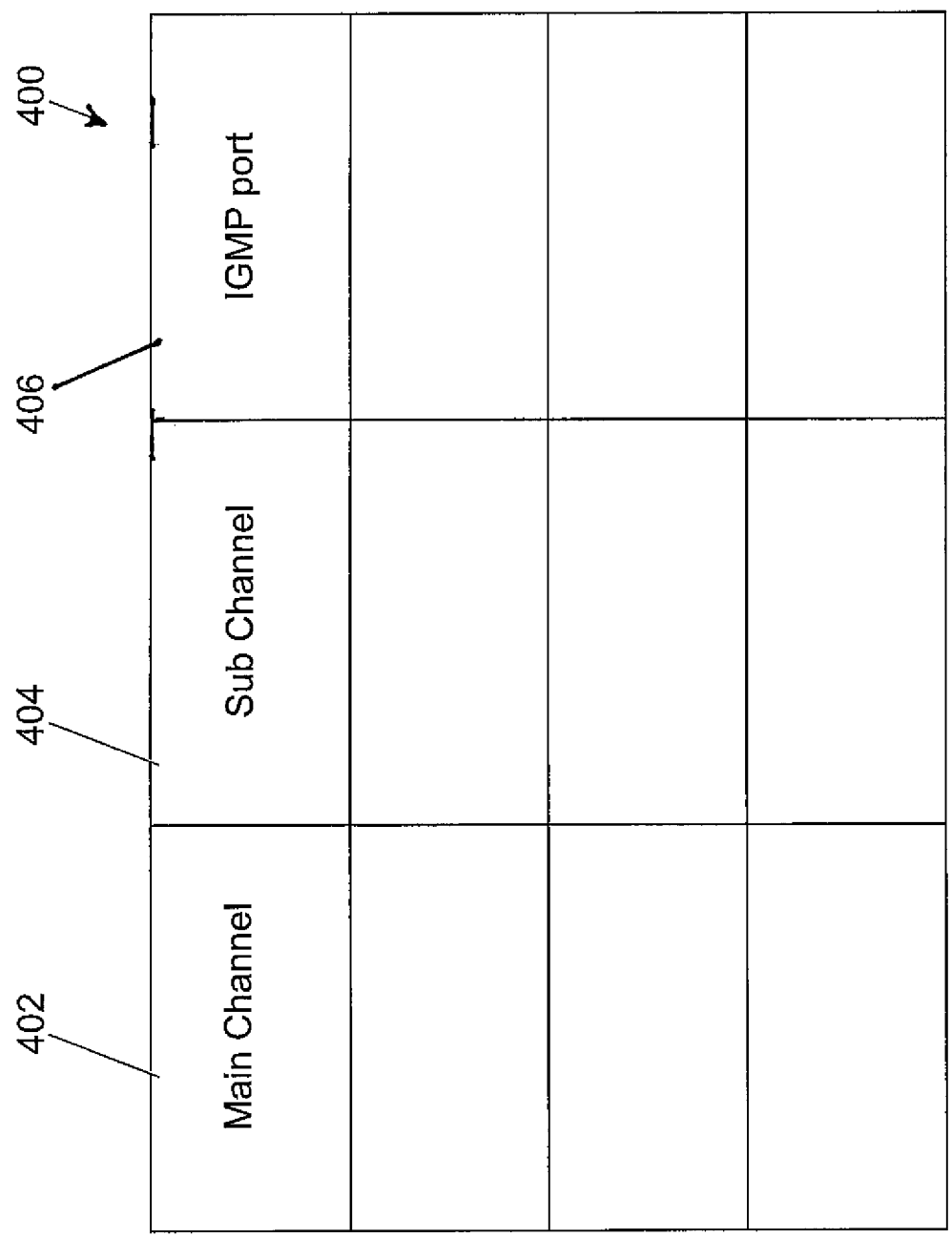
FIG. 4 is a table for showing the PIP table of information.

The user is viewing a multicast of a specific channel (this will be referred to herein as "channel A") using a STB 300 which includes a connection with a PIPP client 302. The client may be located on a PC 304 or perhaps within the gateway or as part of the STB or TV. The user wishes to view a further channel (this will be referred to as "channel B") as a PIP within channel A. The user makes a request 306 via the PIP client 302 and the network 308. The request 306 is received at the PIPP server 310 and entered into the PIPP server table 312. The table 312 details are shown in FIG. 4 and will be described in more detail below. The server table 312 makes a request for formation of the required channel to the PIP encoder 314. The encoder 314 monitors the network 308 to identify the existing channels which are currently being transmitted on the network 308. The encoder 314 can then re-encode the required combination of channels to build the necessary PIP channel. A video recorder and player 316 may be used to store the PIP channel prior to transmitting to the user. The table 312 is updated with each change, amendment, variation, etc. to the PIP channels.

An enquiry is then made to the IGMP protocol to determine if there is already a PIP channel containing channel A with a PIP of channel B. If such a PIP channel exists, the PIP table 312 is updated with the details of the IGMP port carrying the required PIP channel and the user is notified of the same so that they can turn the turner of the STB 300 or TV to this channel. If the IGMP enquiry determines that no relevant PIP channel exists a determination is made as to whether the available bandwidth, either to the user or in total, to support the creation of a new PIP channel. If there are sufficient resources for creation of a new channel a new PIP channel will be created by the PIP encoder 314 and the PIP table 312 will be updated. The updated PIP table 312 will then be communicated to the PIPP client 302 via the PIPP server 310. The user may then connect to the newly created PIP channel.

If there is not sufficient bandwidth available to create a new PIP channel at the present time, a request may be entered in the IGMP server for notification of when sufficient bandwidth is available. When notification is received a determination is made as to whether or not the new channel is still required and if so it is formed and the PIP table 312 is updated.

The PIPP server table 312 is used to ensure that details of available PIP channels are communicated with the PIP client 302 at the user end. If the request 306 for a particular PIP channel indicates that the particular PIP channel already exists the STB 300 or TV may be returned directly without need for the request to go to the PIPP server 310.

Referring now to FIG. 4, an example of PIP table 400 information is shown. The table 400 sets out details of the main channel (e.g., channel A) 402, the sub channel (e.g., channel B) 404 and the IGMP port 406 on which the PIP channel may be transmitted.

The result of preparing the PIP channel in this way is that the STB or TV at the user end only needs one tuner. As the PIP is created, encoded as a single channel and sent as a signal channel there is no need for the STB or TV to have additional tuners at the user location. Apart from the PIPP client all other resources for this invention will be found at the headend equipment and will be used for multiple users, thereby minimizing the overheads in equipment for the system as a whole.

Figure 5:
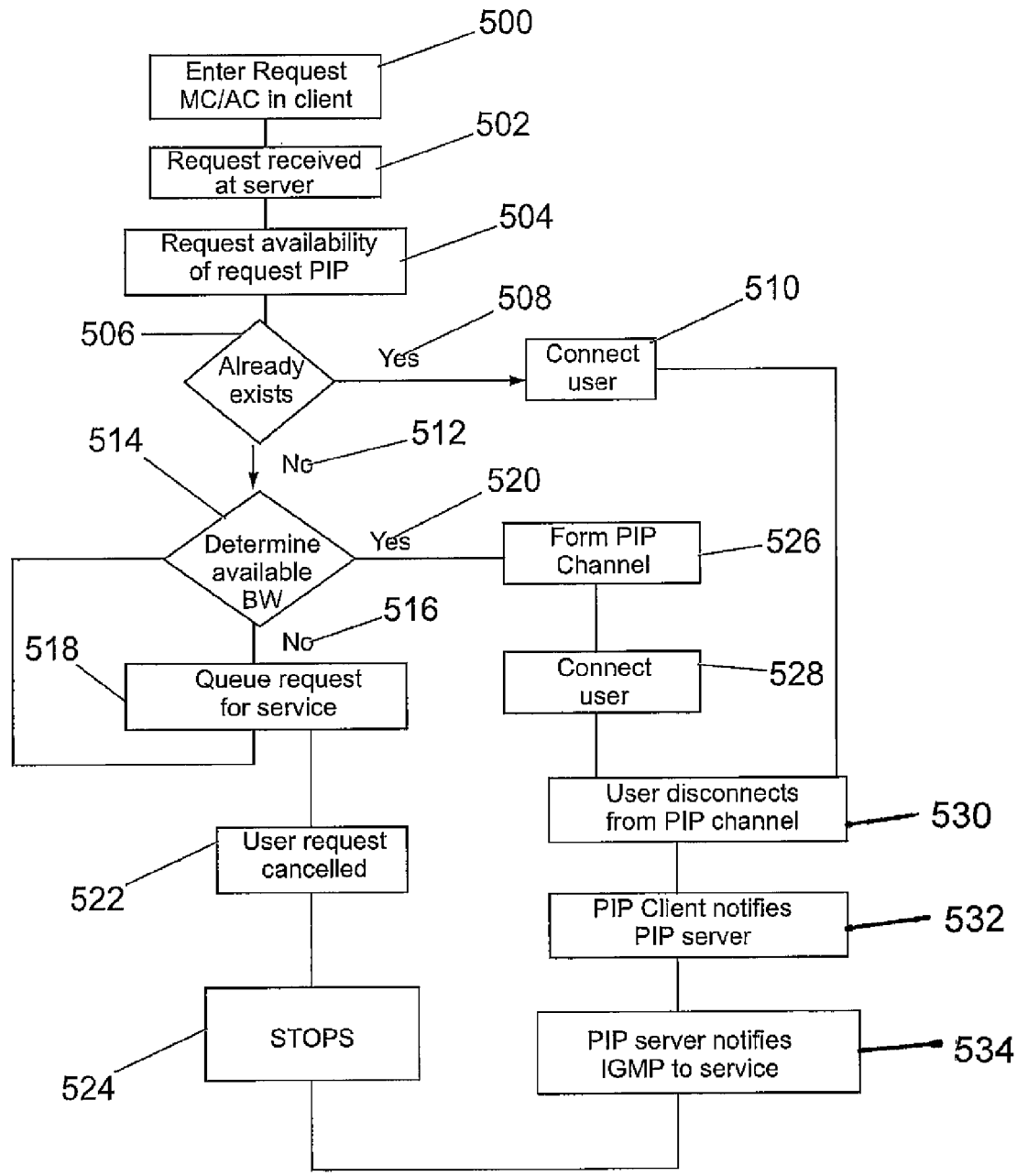
FIG. 5 is a flow chart of the steps carried out in the present invention.

Referring now to FIG. 5, the main steps of the present invention are set out.

The user enters a request for a PIP service comprising channel A and channel B (500) to the PIPP client. The request is transmitted to the PIPP server and received there 502. A request for the required PIP server is made via the PIP table and the IGMP. A determination is made to determine if the service already exists (506).

If yes, 508 the user is connected to the service by connecting to the correct channel as notified to the PIPP server by IGMP server (510).

If the service does not already exist (no, 512) a determination is made as to whether there is available bandwidth (514). If there is not sufficient bandwidth (no, 516) a request for this service is queued to await available bandwidth 518. The check for available bandwidth (determination at step 514) continues until there is available bandwidth (yes, 520) or until the user request is cancelled (522). At that point the process stops 524 and all entries in the PIPP client and server relating to required PIP channel are deleted as will be described in greater detail below (530, 532, 534, 524).

If there is sufficient bandwidth to form a PIP channel (yes, 520) a new PIP channel is formed in any appropriate way, for example using encoder, recorded material, etc. to produce the required channel 526. Once the channel is formed the PIP table is updated at both the PIPP server and client. By updating the PIPP server, other users requesting the same combination of channels in PIP can be notified of the same by the PIPP server without another channel that is the same being created (526). The user (or users) can then be connected to the PIPP channel 528.

Once all users connected to a given PIP channel have disconnected from the channel, by turning to a different channel, for example, (530) the PIPP server and client are updated to terminate the service (532). The PIP table is cleared of all details of the PIP channel and if appropriate the IGMP server is notified (534). The process then stops (524).

While the invention has been particularly shown and described with reference to a preferred embodiment, it will be understood that various changes in form and detail may be made therein without departing from the spirit, and scope of the invention.

The invention claimed is:

1. A method of forming a picture in picture (PIP) service over an internet protocol (IP) transmission to one or more users, the method comprising:

receiving, at a PIP server at a headend of a PIP system, a request from a PIP client device at a user end of the PIP system for a PIP channel comprising a first predetermined channel superimposed with a second predetermined channel;

determining, at the PIP server, if the PIP channel has already been formed by the PIP server using a PIP channel table at the PIP server, wherein the PIP channel table comprises details of existing PIP channels previously formed by the PIP server;

forming the PIP channel at the PIP server if the PIP channel does not already exist and updating the PIP channel table at the PIP server to include the PIP channel;

transmitting the PIP channel on a dedicated channel from the PIP server to the PIP client device that requested that PIP channel;

decoding the PIP channel at the PIP client device using a single tuner;

transmitting contents of the PIP channel table from the PIP server to a client table at the PIP client device to update the client table, wherein after the updating, the client table contains the same information as the PIP channel table;

using the client table at the PIP client device to make the request for the PIP channel;

wherein, if the requested PIP channel exists in the client table, using the single tuner to tune the PIP client device directly to the PIP channel without sending the request to the PIP server, and wherein if the requested PIP channel does not exist in the client table, the PIP client device requests the PIP channel from the PIP server;

and determining, in response to the PIP channel not existing, an available bandwidth for the one or more users to support the PIP server creating the requested PIP channel, wherein if the available bandwidth is sufficient, creating the requested PIP channel, and if the available bandwidth is insufficient, entering the request on an Internet Group Management Protocol server for notification of when the available bandwidth is sufficient.

2. The method of claim 1, wherein the receiving a request comprises requesting a PIP channel comprising more than two channels.

3. The method of claim 1, wherein if a PIP channel matching the request already exists, notifying the PIP client device of the dedicated channel on which the PIP channel is transmitted.

4. The method of claim 1, further comprising updating the PIP channel table with any new requests for a PIP channel.

5. The method of claim 1, further comprising stopping transmission of the dedicated channel carrying the PIP channel if the combination of the first and second channels is no longer required by the PIP client device and any other PIP client devices.

6. A system of forming a picture in picture (PIP) service over an internet protocol (IP) transmission to one or more users, the system comprising:

a PIP server at a headend of a PIP system for receiving a request from a PIP client device at a user end of the PIP system for a PIP channel comprising a first predetermined channel superimposed with a second predetermined channel, wherein the PIP server comprises:

a system for determining if the PIP channel has already been formed by the PIP server using a PIP channel table at the PIP server, wherein the PIP channel table comprises details of existing PIP channels previously formed by the PIP server;

a system for forming the PIP channel if the PIP channel does not already exist and updating the PIP channel table at the PIP server to include the PIP channel; and a system for transmitting the PIP channel on a dedicated channel to the PIP client that requested that PIP channel;

the PIP client device comprising a system for decoding the PIP channel at the PIP client device using a single tuner;

wherein the PIP server further comprises a system for transmitting contents of the PIP channel table to a client table at the PIP client device to update the client table, wherein after the updating, the client table contains the same information as the PIP channel table;

wherein the PIP client device further comprises a system for using the client table to make the request for the PIP channel; and wherein, if the requested PIP channel exists in the client table, using the single tuner to tune the PIP client device directly to the PIP channel without sending the request to the PIP server, and if the requested PIP channel does not exist in the client table, the PIP client device requests the PIP channel from the PIP server;

and a system for determining, in response to the PIP channel not existing, an available bandwidth for the one or more users to support the PIP server creating the requested PIP channel, wherein if the available bandwidth is sufficient, creating the requested PIP channel, and if the available bandwidth is insufficient, entering the request on an Internet Group Management Protocol server for notification of when the available bandwidth is sufficient.

7. The system of claim 6, wherein the request comprises a PIP channel comprising more than two channels.

8. The system of claim 6, wherein the PIP server further comprises a system for notifying the user of the dedicated channel on which the PIP channel is transmitted if a PIP channel matching the request already exists.

9. The system of claim 6, further comprising a system for updating the PIP channel table with any new requests for a PIP channel.

10. The system of claim 6, further comprising a system for stopping transmission of the dedicated channel carrying the PIP channel if no users still require the particular combination of the first and second channels.

11. A computer program product stored on a non-transitory computer readable medium for forming a picture in picture (PIP) service over an internet protocol (IP) transmission, the computer readable medium comprising program code for:

receiving, at a PIP server at a headend of a PIP system, a request from a PIP client device at a user end of the PIP system for a PIP channel comprising a first predetermined channel superimposed with a second predetermined channel;

determining, at the PIP server, if the PIP channel has already been formed by the PIP server using a PIP channel table at the PIP server, wherein the PIP channel table comprises details of existing PIP channels previously formed by the PIP server;

forming the PIP channel, at the PIP server, if the PIP channel does not already exist and updating the PIP channel table at the PIP server to include the PIP channel;

transmitting the PIP channel on a dedicated channel from the PIP server to the PIP client device that requested that PIP channel to update the client table;

decoding the PIP channel at the PIP client device using a single tuner;

transmitting contents of the PIP channel table from the PIP server to a client table at the PIP client device, wherein after the updating, the client table contains the same information as the PIP channel table; and using the client table at the PIP client device to make the request for the PIP channel;

wherein, if the requested PIP channel exists in the client table, using the single tuner to tune the PIP client device directly to the PIP channel without sending the request to the PIP server, and wherein if the requested PIP channel does not exist in the client table, the PIP client device requests the PIP channel from the PIP server;

and determining, in response to the PIP channel not existing, an available bandwidth for the one or more users to support the PIP server creating the requested PIP channel, wherein if the available bandwidth is sufficient, creating the requested PIP channel, and if the available bandwidth is insufficient, entering the request on an Internet Group Management Protocol server for notification of when the available bandwidth is sufficient.

* * * * *